(No Model.) 2 Sheets—Sheet 1.
J. L. CHAPMAN.
CHASER DIE.
No. 575,148. Patented Jan. 12, 1897.
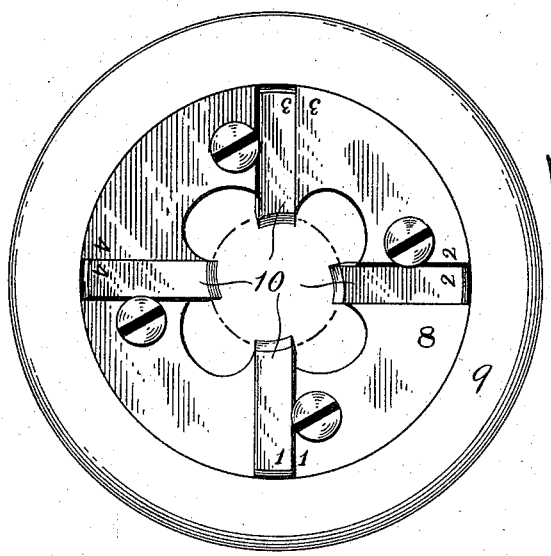
Fig. 1.
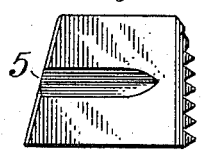
Fig. 6.
Fig. 7.
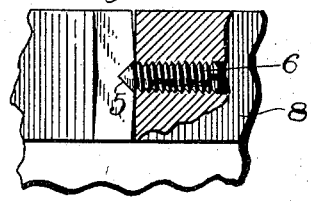
Fig. 8.
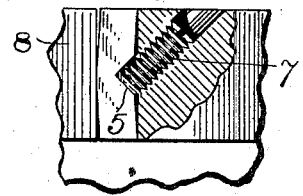
Fig. 9.
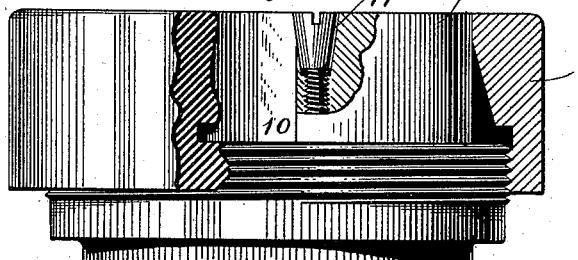
Fig. 2.
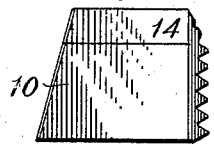
Fig. 3.
Fig. 4.
Fig. 5.
Witnesses.
Jos. Merritt
L. H. Horner
Inventor,
Joseph L. Chapman.
By his Attorney
W. H. Honiss (No Model.) 2 Sheets—Sheet 2.

J. L. CHAPMAN.
CHASER DIE.

No. 575,148. Patented Jan. 12, 1897.

Witnesses
Jos. Merritt.
L. H. Horner.

Inventor:
Joseph L. Chapman,
By his Attorney,
W. H. Honiss.

UNITED STATES PATENT OFFICE.

JOSEPH L. CHAPMAN, OF HARTFORD, CONNECTICUT.

CHASER-DIE.

SPECIFICATION forming part of Letters Patent No. 575,148, dated January 12, 1897.

Application filed March 5, 1896. Serial No. 581,950. (No model.)

*To all whom it may concern:*

Be it known that I, JOSEPH L. CHAPMAN, a citizen of the United States, residing at Hartford, in the county of Hartford and State of Connecticut, have invented certain new and useful Improvements in Chaser-Dies, of which the following is a full, clear, and exact specification.

This invention is an improvement relating to dies for cutting the external threads of screws, and particularly to those dies which contain removable and adjustable chasers.

This improvement pertains to the chasers themselves and to the means whereby they are clamped in their collet or holder, adapting them to be manufactured more economically and in such a way as to avoid the distortion to which their present usual form renders them peculiarly liable.

Figures 1 to 5, inclusive, represent the form and method of application of my improvement, while Figs. 6 to 14, inclusive, represent the most approved preëxisting form of chasers, and these are herein shown in order to illustrate their defective and objectionable features, so as to show by comparison the nature and scope of my present invention.

Figure 10:
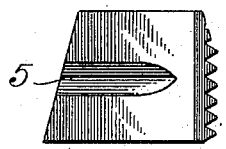
Figure 11:
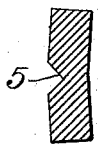
Figure 12:
Figure 13:
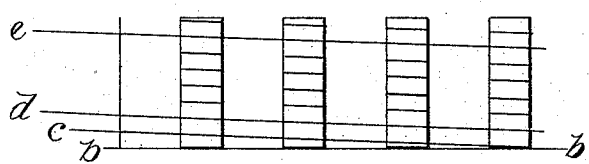
Figure 14:
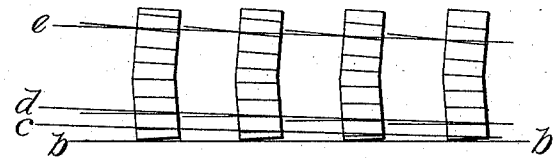

Fig. 1 of the drawings is an end view of a die of the class to which my invention is especially applicable, showing four cutting-chasers and their holding means made in accordance with my invention. Fig. 2 is a side view, partly in section, showing an end view of one of my improved chasers with my improved means for clamping it in its collet. Fig. 3 is a side view, and Fig. 4 an end view, of one of my improved chasers separate from its collet. Fig. 5 is a fragmentary end view corresponding to that of Fig. 1, showing my improvement as adapted to the cutting of left-hand threads. Fig. 6 is a side view, and Fig. 7 is an end view, of a chaser made in accordance with the best-accepted previous practice, showing in Fig. 7 one of the distortions to which chasers of this form are peculiarly subject in the hardening process. Figs. 8 and 9 are sectional views corresponding in part to that of Fig. 2, showing the two different methods hitherto accepted as the best practice of fastening chasers of the form shown in Fig. 6 in position in their collet. Fig. 10 is a side view of a chaser similar to that of Fig. 6. Fig. 11 is a sectional end view taken on the line 11 11 of Fig. 10, showing the character and direction of the distortion which most commonly results from the process of hardening these chasers, while Fig. 12 is an end view of the chaser of Fig. 10, showing in a measure the effect of the distortion upon the teeth of the chaser. Fig. 13 is a diagrammatic view representing the flat development of a circle corresponding to the dot-and-dash circle shown in Fig. 1, showing the four chasers of that figure side by side in their proper relation to each other, illustrating how the teeth of a properly-made chaser should conform to the geometrical lines representing the angle of the spiral formed by the thread they are intended to cut. Fig. 14 is a diagrammatic view similar to that of Fig. 13, illustrating in comparison therewith the effect of the distortion of the screw-threads of four chasers similar to that of Fig. 12.

In order to show clearly and fully the nature and scope of my invention and its relation to the prior art, it is deemed necessary to set forth as briefly as possible the state of this particular branch of that art and the conditions thereof under which arises the desirability and the importance of the present invention.

Figs. 1 and 2 of the drawings represent a chaser-die which in the general form herein shown is manufactured in very large quantities by one of the leading manufacturers of this country, and which, because of its many excellent features, is very extensively used throughout the country. The methods employed in the manufacture of this die are calculated to make its parts perfectly interchangeable, so that new chasers may at any time be ordered from the manufacturers and inserted in a collet to replace those which have been worn out. This is more difficult than would appear at first sight, for the reason that the cutting-teeth of each one of these chasers must not only agree in pitch with those of the other chasers of its set, but each one must when placed in the collet have its teeth located in proper relation to the spiral described by the teeth of the other chasers. The significance of this requirement will be better understood by reference to Fig. 13, which is a diagrammatic representation of a flat development of the dot-and-dash circle shown in Fig. 1 with the chasers represented side by side. The thread-teeth are represented upon the faces of these chasers by lines which stand at a proper angle to the base-line *b b*, upon which the lower edges of the four chasers rest. The lines *c d e* represent the proper angle of the spiral formed by these threads, corresponding to the path upon which the succeeding teeth of the chasers must follow each other in the operation of cutting a thread upon a bolt.

In the view shown in Fig. 13 the chasers are represented as being free from distortion, and therefore the lines upon their surfaces which represent the thread-teeth coincide exactly with the lines *c d e*, which represent the angle of the spiral formed by them when in their cutting position. (Shown in Fig. 1.) From this diagram it will be seen that these dies in order to follow each other properly around the thread of a bolt must invariably occupy this exact relation to one another. In order to secure perfect interchangeability, it is therefore necessary in the manufacture of these chasers and of the collets for holding them that they shall be exact as to at least three particulars: first, that they must be equally spaced circumferentially around the collet; second, that the thread-teeth on each chaser must be so located as to coincide with the imaginary spiral lines describing the thread, corresponding to the lines *c d e* of Fig. 13; and, third, it is necessary that after the thread-teeth have been cut upon the soft chasers in this exact and proper relation to one another that the chasers shall be hardened in such a way as not to distort them, and thus throw the thread-teeth out of their proper relation to the spiral.

Furthermore, as a means of satisfying the second of the above-enumerated requirements, it is necessary that the teeth of each chaser shall be located thereon in an exact and unvarying relation to that portion thereof which rests upon the base-line *b b*, corresponding to the bottom of the slots in the collet. As a convenient way of securing this exactness in the relation of the teeth the chasers are numbered 1 2 3 4, as shown in Fig. 1, and are regarded as four distinct kinds, each of which has its teeth cut or "hobbed" in unvarying relation to its base or gaging edge. This enables the chasers of a certain number to be interchanged with all others of the same number.

After having taken all possible care and pains in the manufacture of the chasers shown in Figs. 6 and 10 it is found that the hardening process is liable to distort them in the way represented in Figs. 7, 8, 9, 11, 12, and 14. This distortion is due to the presence of the groove 5, made to receive the point of a set-screw which is employed to press the chaser to its seat in the collet, as shown in Figs. 8 and 9. That groove being cut across the side of the chaser, so as to allow of adjusting it in the collet, so weakens the chaser as to make it peculiarly liable to bend along the general line of the groove 5 during the hardening process, thus causing the distortion of the cutting-teeth above described. The curved sides of the distorted chasers are then ground or lapped so as to enable them to be inserted in their respective slots in the collets; but this truing of the sides of the chasers does not correct in the least degree the distortion of their teeth, which therefore do not follow each other properly in cutting a thread, thereby producing imperfect threads and causing an undue amount of friction by the wedging action of the teeth. This also causes a waste of power, besides wearing out the teeth of the chasers very rapidly. A further objectionable feature of this method of fastening the chasers in the collets is that the screws which enter the grooves of the chasers are very liable to become loosened by the strains to which the chasers are subjected in working, especially when their teeth do not "lead" correctly, or, in other words, do not exactly follow each other in true spirals, as above explained. On account of the changes to which these screws are liable in hardening it is necessary to make them loose in the thread, in order to have them interchange with certainty, and a screw which is thus loosely fitted in its thread is poorly adapted to maintain a suitable grip upon the chasers when applied as shown in Figs. 8 and 9, especially when the chaser is distorted in the direction shown in the latter figure, which allows it to rock upon a point opposite to the point of application of the set-screw. A further objection to this manner of applying the screws arises from the difficulty of making the screw bear equally well on both sides of its axis. For example, referring to Fig. 8, if the screw should happen to bear hardest against the upper side of the groove the effect would be to raise the chaser away from its base, and it would also operate to roll the chaser away from its adjusting-ring when the screw is turned toward that direction to tighten it. This feature is a constant source of annoyance in adjusting the chasers to the size they are to cut, for in tightening the screw it is liable to throw the chaser away from the ring. Then when the strain of the cut is thrown upon it the chaser is forced back against the ring, turning and thus loosening the screw and at the same time increasing the cutting size of the die. The same fault is found with the application of the screw shown in Fig. 9, inasmuch as it is equally difficult to make the end of that screw bear equally well over its entire surface, and whichever portion of that surface bears upon the chaser is liable, by its wiping action, to move the chaser and thus disturb the adjustment.

It is well nigh impossible to make the screw of Fig. 8 so that its beveled point shall be concentric with the axis of its theads, or the screw of Fig. 9 so that its flat end shall be at right angles with the thread-axis, unless those screws are both made upon lathe-centers, which would be far too expensive a method for commercial purposes. This well-known irregularity to which those screws are peculiarly liable adds to the difficulty of making them bear properly on upon their chasers.

A further objection to the form of both the screws shown in Figs. 8 and 9 is that the metal which surrounds their slots is so reduced by the thread as to make them very liable to be broken or split off by the use of the screw-driver thereon, and the slotted end is so reduced in size as to require the use of a small screw-driver, thus reducing the amount of force that can be applied in tightening the screws upon the chasers.

Having thus explained as briefly as possible the nature of the objections which exist in practice to the present form of chasers and to the present methods of securing them in this class of die, I will now describe the features of my improved die, whereby these objections are obviated.

The collet 8 and its adjusting-ring 9 may be, as shown, substantially like those hitherto in use, my improvements relating more particularly to the chaser and to the screw which is employed in holding it to place. That chaser, 10, as shown in detail in Figs. 3 and 4, is made of uniform thickness, excepting at its upper side, which is beveled to agree with the body of the tapering screw 11. It is to be observed that the beveled portion 14 of the chaser is adjacent to that part of its thread which in the usual practice is cut away to enable the chaser to start gradually upon its cut, so that even if the chaser could be distorted at this point in hardening, as a result of the reduction of its cross-sectional area, it will be seen that that distortion would not in any way affect the lead of the chaser or the agreement of its teeth with the lines $c\ d\ e$ of the diagram Fig. 13.

The form of the screw 11 and its relation to the chaser and to the collet is best shown in Fig. 2. The die shown in Figs. 1 and 2 is adapted to cut right-hand threads turning in the direction of the arrow, and it will be observed that the screws are located on the leading or advancing sides of these chasers. It will also be observed in Fig. 2 that the thread of the screw 11 is made left-handed. This is so made in order that the backward crowding action of the work upon the chasers will operate to tighten the screws to place, because of the threads thereof being left-handed. When used in connection with a left-hand cutting-die, as shown in Fig. 5, the screw should be on the opposite side of the chaser 10, which in such a die will be the leading side, as indicated by the arrow, and in this case the thread of the screw 11 should of course be right-handed. This method of applying the plain portion of the screw between the beveled side of the chaser and the adjacent tapering side of the hole in the collet interposes a solid metal-to-metal relation between the two surfaces without imposing any strain upon the threads of the screw, excepting that slight tension necessary to draw the tapering portion of the screw solidly into contact with the collet and the chaser. The solidity of the joint is thus independent of the accuracy of fit or the strength of the thread itself, and, as the strain of the cut is not thrown upon the thread, it is not liable to become stripped or otherwise damaged, as in the old form. The nick of my improved screw is also less liable to be injured by the application of the screw-driver thereto, inasmuch as it is located in an enlarged portion of the screw which is free from threads, thereby permitting the use of a larger screw-driver and preventing the liability of splitting or breaking off one side of the screw, which, as above explained, frequently happens in the use of screws like those shown in Figs. 8 and 9.

A further advantageous feature of this invention resides in the fact that the face of the die may thereby be made smooth and free from unfilled recesses—such, for example, as that shown in Fig. 9 for the screw 7.

It is not essential that the beveled portion 14 shall extend entirely across the upper side of the chaser 10, as shown in Fig. 3, as it will sufficiently serve its purpose if made wide enough to permit of the required adjustment of the chaser; but I prefer to make it as shown in Fig. 3, as the beveled portion 14 may then be readily finished off with the same milling-cutter which finishes the adjacent side of the chaser and at the same operation. Therefore these surfaces may be always accurate in their relation to each other and to the teeth, whereas the groove 5 of the chasers of Figs. 6 and 10 must be made by an additional operation, involving additional cost and the liability of variation in the position of the groove relative to the screws 6 or 7, and that variation is liable to be increased by the subsequent distortion due to the hardening of the grooved form of chaser, as hereinbefore set forth.

I claim as my invention—

1. As a new article of manufacture, a radially-cutting die-chaser, having a relatively narrow beveled surface adjacent to one edge of its leading side face, for the purpose specified.

2. In combination with a radially-slotted collet or holder therefor, a die-chaser having a relatively narrow beveled surface adjacent to one edge of its leading side face, with correspondingly-beveled clamping means engaging therewith.

3. In a die of the class specified, in combination with a radially-arranged chaser-die, a screw located upon the leading side of the chaser with its axis parallel with the axis of the die, the screw having a plain tapering portion for engaging with a correspondingly-beveled portion of its chaser, and having a threaded portion whereby the plain portion may be tightened upon the chaser.

4. In a die of the class specified, in combination with a chaser thereof, a screw located upon the leading side of the chaser with its axis substantially parallel with the axis of the die, having a plain tapering portion adapted to bear against a correspondingly-beveled portion of the chaser, and having a threaded portion by means of which it may be adjusted endwise, the threaded portion being left-handed when employed in a right-hand die, and being right-handed when employed in a left-hand die, substantially as described and for the purpose specified.

JOSEPH L. CHAPMAN.

Witnesses:
JENNIE NELLIS,
W. H. HONISS.